(12) United States Patent
Liefooghe et al.

(10) Patent No.: US 12,250,908 B2
(45) Date of Patent: Mar. 18, 2025

(54) STUFFER ASSEMBLY FOR AN AGRICULTURAL BALER

(71) Applicant: CNH Industrial America LLC, New Holland, PA (US)

(72) Inventors: Dries Liefooghe, Alveringem (BE); Jeroen Devroe, Izegem (BE)

(73) Assignee: CNH Industrial America LLC, Holland, PA (US)

( * ) Notice: Subject to any disclaimer, the term of this patent is extended or adjusted under 35 U.S.C. 154(b) by 176 days.

(21) Appl. No.: 18/084,940

(22) Filed: Dec. 20, 2022

(65) Prior Publication Data
US 2023/0189715 A1 Jun. 22, 2023

(30) Foreign Application Priority Data
Dec. 22, 2021 (EP) .................................... 21216921

(51) Int. Cl.
  *A01F 15/10* (2006.01)
  *A01D 69/08* (2006.01)
  *A01F 15/08* (2006.01)

(52) U.S. Cl.
  CPC .............. *A01F 15/10* (2013.01); *A01D 69/08* (2013.01); *A01F 15/0841* (2013.01); *A01F 2015/102* (2013.01)

(58) Field of Classification Search
  CPC .................. A01F 15/10; A01F 15/0841; A01F 2015/102; A01D 69/08
  See application file for complete search history.

(56) References Cited

U.S. PATENT DOCUMENTS

| | | | |
|---|---|---|---|
| 6,385,952 B1 | 5/2002 | Bergkamp et al. | |
| 10,004,177 B2 | 6/2018 | Weyne | |
| 10,881,050 B2 | 1/2021 | Figger et al. | |
| 2012/0221213 A1 | 8/2012 | Seeger | |
| 2014/0148286 A1 | 5/2014 | Murray et al. | |
| 2016/0014965 A1* | 1/2016 | Naeyaert | A01F 15/101 56/432 |
| 2018/0263186 A1* | 9/2018 | Weyne | A01D 78/04 |
| 2019/0133046 A1 | 5/2019 | Standaert et al. | |

FOREIGN PATENT DOCUMENTS

| | | |
|---|---|---|
| CN | 209724998 U | 12/2019 |
| EP | 2433485 A1 | 3/2012 |
| EP | 3818810 A1 | 5/2021 |
| EP | 3834604 A1 | 6/2021 |

OTHER PUBLICATIONS

Extended European Search Report for EP Application No. 21216921.3 dated Oct. 7, 2022 (6 pages).

* cited by examiner

*Primary Examiner* — Jimmy T Nguyen
(74) *Attorney, Agent, or Firm* — Peter K. Zacharias; Rebecca L. Henkel; Rickard K. DeMille

(57) ABSTRACT

A stuffer assembly includes a clutch assembly for selectively coupling an input shaft to an output shaft of a drive mechanism, the clutch assembly including a first rotary element and a second rotary element, one of which is provided on the input shaft and the other one on the output shaft, a plurality of engagement elements, and an electronically controllable actuator configured to engage and disengage the plurality of engagement elements with both of the first rotary element and the second rotary element.

13 Claims, 5 Drawing Sheets

STUFFER ASSEMBLY FOR AN AGRICULTURAL BALER

FIELD OF THE INVENTION

The present invention relates to a stuffer assembly for an agricultural baler, to an agricultural baler comprising the stuffer assembly as well as to a method for operating the stuffer assembly.

BACKGROUND OF THE INVENTION

In an agricultural baler, crop material previously cut and formed to windrows on a field is picked up from the ground by a pick-up unit of the baler and fed into a stuffer chute of the baler where it is collected and usually precompressed to form a charge of crop material. A completed charge of crop material is then transferred into a baling chamber of the baler by means of a stuffer having a plurality of tines, which engage the charge of crop material and push same from the stuffer chute into the baling chamber. In the baling chamber, a reciprocating plunger is provided to compress multiple charges of crop material in order to form a bale.

Usually, the density of crop material collected within the stuffer chute is mechanically detected e.g. by means of so-called trip fingers arranged on a bottom end of the stuffer chute. The trip fingers indicate whether the stuffer chute is filled to a desired degree with crop material of a desired density. For example, the trip fingers are deflected by crop material reaching the bottom end of the stuffer chute. In order to actuate the stuffer upon detection of the desired amount and density of crop material in the stuffer chute, a mechanical linkage is provided between the trip fingers and a stuffer clutch assembly. Hence, deflection of the trip fingers is transferred to a mechanical actuating arrangement configured to couple an input shaft to an output shaft of a stuffer drive mechanism thereby actuating the stuffer to push the charge of crop material into the baling chamber.

However, the mechanical linkage often comprises multiple movable components, some of which having a shape difficult to manufacture in order to accommodate the mechanical linkage within the limited space available within the baler. Also, the components of the mechanical linkage are subject to significant wear and tear. In addition, the mechanical detection of trip parameters is quite limited.

SUMMARY OF THE INVENTION

It is an object of the present invention to provide a stuffer assembly and a method for operating a stuffer assembly enabling a reduction in manufacturing costs and efforts as well as a more flexible tripping of the stuffer.

According to the present invention a stuffer assembly for an agricultural baler comprises a stuffer chute for collecting and precompressing a charge of crop material therein and a stuffer configured to transfer the charge of crop material collected within the stuffer chute into a baling chamber of the agricultural baler. The stuffer comprises a stuffer arm having a first end and a second end opposite the first end, wherein a tine bar is mounted on the second end of the stuffer arm. The stuffer assembly further comprises a drive mechanism for driving the stuffer, wherein the drive mechanism comprises an input shaft connectable to a power source, an output shaft coupled to the first end of the stuffer arm, and a clutch assembly for selectively coupling the input shaft to the output shaft. The clutch assembly comprises a first rotary element and a second rotary element, wherein one of the first rotary element and the second rotary element is provided on the input shaft and the other one of the first rotary element and the second rotary element is provided on the output shaft, a plurality of engagement elements, wherein each engagement element of the plurality of engagement elements is configured to selectively engage with both of the first and second rotary elements, and an electronically controllable actuator configured to engage and/or disengage the plurality of engagement elements with both of the first and second rotary elements.

In this way, a stuffer assembly is provided which allows electronically controlled actuation of the stuffer thereby eliminating the need for a mechanical linkage between the stuffer chute and the stuffer clutch assembly as well as for a complex mechanical actuating arrangement configured to couple the input shaft to the output shaft. Also, a trip signal can then be easily adapted and individually associated with desired parameters, such as characteristics of the crop material collected within the stuffer chute.

In a preferred embodiment, the stuffer assembly therefore comprises a plurality of sensors configured to detect a characteristic of crop material within the stuffer chute and to provide an output signal indicating said characteristic. The actuator is configured to actuate and move the plurality of engagement elements in response to a trip signal, in particular an electronic trip signal, associated with the output signal of the plurality of sensors. That is, the trip signal may be generated based on the output signal of the plurality of sensors. The actuator may be communicatively connected to the plurality of sensors.

The plurality of sensors is preferably distributed across the stuffer chute. For example, the plurality of sensors is distributed across a length and/or a width of the stuffer chute. Particularly, the plurality of sensors may comprise multiple sensors arranged behind each other between an inlet and an outlet of the stuffer chute along the length of the stuffer chute. Alternatively or in addition, the plurality of sensors may comprise multiple sensors arranged next to each other between a left sidewall and a right sidewall of the stuffer chute. In any case, the plurality of sensors may be selected from a group comprising mechanical, electrical, pneumatic, hydraulic, and optical sensors.

The crop characteristic detected by the plurality of sensors may comprise one or a combination of a density, a humidity, a weight, and a volume of the crop material collected within the stuffer chute as well as a distribution of the crop material over the length and/or the width of the stuffer chute.

In this way, it is possible to trip the stuffer in response to a certain crop characteristic, such as the density, of the crop material reaching a predetermined condition, such as a threshold value. The desired crop characteristic and/or the predetermined condition may be selected by an operator of the baler and provided e.g. by means of a user input. Hence, tripping of the stuffer can be adapted as desired.

It is particularly preferred that the stuffer assembly further comprises a control unit communicatively connected to the plurality of sensors and to the actuator, wherein the control unit is configured to receive the output signal of the plurality of sensors and to provide the trip signal to the actuator based on the output signal. Thus, the actuator may be electronically controlled by the control unit.

The drive mechanism will now be described in greater detail. The input shaft is connected to a power source, such as a drive shaft of the baler and a stuffer gearbox, the drive shaft being connectable to a PTO of a towing vehicle, such as a tractor. The output shaft is coupled to the stuffer arm, e.g. by means of a cam arrangement in a known manner.

That is, the output shaft may comprise a cam disk operatively connected to the stuffer arm. The cam disk may be provided on a first end of the output shaft and one of the first and second rotary elements may be provided on a second end of the output shaft opposite the first end.

The clutch assembly is configured to selectively couple the input shaft to the output shaft in order to actuate the stuffer once a charge of crop material collected within the stuffer chute is completed. Therefore, in response to the trip signal, the actuator actuates the plurality of engagement elements such that they engage with the first and second rotary elements thereby coupling the first rotary element and the second rotary element to each other. A torque can then be transferred from the input shaft to the output shaft for driving the stuffer.

While collecting a charge of crop material within the stuffer chute, however, the stuffer may not be operated to avoid transfer of an incomplete charge of crop material into the baling chamber. Therefore, the plurality of engagement elements does not engage with both of the first and second rotary elements, thereby decoupling the first rotary element and the second rotary element from each other, such that no torque is transmitted from the input shaft to the output shaft. Generally, the drive mechanism may comprise a brake acting on the output shaft or the one of the first and second rotary elements provided on the output shaft while no torque is to be transmitted.

Hence, selectively coupling the input shaft to the output shaft means that the shafts are only coupled if needed, e.g. in response to the trip signal initiating a stuffer cycle.

Preferably, the first rotary element and the second rotary element are coaxially aligned and even more preferably, the input shaft and the output shaft are coaxially aligned with the first and second rotary elements as well. An axis of rotation or centerline of the first rotary element, the second rotary element, the input shaft and the output shaft may therefore coincide. The first and second rotary elements are preferably arranged in parallel, such that said axis of rotation extends substantially perpendicular to facing surfaces of the first and a second rotary elements.

The first and second rotary elements may be integrally formed with the respective one of the input shaft and the output shaft or may be separately formed and fixedly attached to the respective one of the input shaft and the output shaft to rotate with the associated shaft. For example, the first and second rotary elements may be formed as disk-shaped or flange-like members on the respective shaft.

To transmit a torque between the first rotary element and the second rotary element, the plurality of engagement elements couples the first rotary element and the second rotary element to each other upon actuation. Preferably, each engagement element of the plurality of engagement elements is an individual element directly coupling the first rotary element to the second rotary element by simultaneously engaging with both, the first rotary element and the second rotary element. A load acting on the plurality of engagement elements is evenly distributed among the plurality of engagement elements when all of the plurality of engagement elements simultaneously couple the first rotary element to the second rotary element. The plurality of engagement elements is preferably actuated as a unit meaning that all of them either engage or do not engage with both of the first rotary element and the second rotary element.

In a particularly preferred embodiment, each engagement element of the plurality of engagement elements is movably received within the first rotary element such that it is movable between a retracted position and an extended position. In the retracted position, each engagement element of the plurality of engagement elements is completely received within the first rotary element. In the extended position, each engagement element of the plurality of engagement elements protrudes from the first rotary element and engages with the second rotary element, while still being partially received in the first rotary element. Consequently, in the extended position, each of the plurality of engagement elements is partially received in the second rotary element as well, thereby coupling the first rotary element to the second rotary element. Generally, the plurality of engagement elements may be movable between the extended position and the retracted position in an axial direction of the first rotary element.

In this embodiment, the actuator is configured to move the plurality of engagement elements from the retracted position into the extended position and/or from the extended position into the retracted position. It is also conceivable that the plurality of engagement elements is biased into one of the retracted position and the extended position and the actuator is configured to move the plurality of engagement elements into the other of the retracted position and the extended position against the bias. For example, each engagement element of the plurality of engagement elements is urged into the extended or into the retracted position by means of an resilient member, such as a spring, and the actuator is configured to apply a force to each engagement element against the spring force of the resilient member.

Further, the first rotary element may comprise a first face and the second rotary element may comprise a second face parallel to and facing the first face. The first rotary element may comprise a plurality of first holes (e.g. blind holes/borings) formed in the first face and the second rotary element may comprise a plurality of second holes (e.g. blind holes/borings) formed in the second face. The plurality of first and second holes thus extends in an axial direction of the respective rotary element.

Each first hole of the plurality of first holes completely receives one engagement element of the plurality of engagement elements positioned in the retracted position. Each second hole of the plurality of second holes partially receives one engagement element of the plurality of engagement elements positioned in the extended position.

The plurality of engagement elements may have an elongated shape having a longitudinal axis. Preferably, each of the plurality of engagement elements is rationally symmetrical with respect to its longitudinal axis. For example, each of the plurality of engagement elements has a cylindrical shape, such as a pin. Then, an inner diameter of the plurality of first and second holes substantially corresponds to an outer diameter of the plurality engagement elements. A certain tolerance may be provided to allow smooth movement of the plurality of engagement elements within the first and second holes. The plurality of first and second holes may each have an axis parallel to a center line of the first and second rotary elements.

In one embodiment, a plurality of grooves is formed in the second face, each of the plurality of grooves extending in a circumferential direction of the second rotary element towards one second hole of the plurality of second holes to guide one of the plurality of engaging means into said hole. One groove is provided for each of the plurality of second holes.

To allow smooth insertion of each of the plurality of engagement elements into a corresponding hole, each groove of the plurality of grooves may have a depth increasing towards the respective second hole of the plurality of second holes. In addition, each of the plurality of grooves may also have a width increasing towards the respective second hole of the plurality of second holes. Preferably, the depth and the width are continuously increasing, respectively. In one embodiment, however, each of the plurality of grooves may have a constant width, wherein only the depth may increase towards the respective second hole of the plurality of second holes.

It is preferred that the each groove of the plurality of grooves ends in one second hole of the plurality of second holes and, therefore, the width of the plurality of grooves adjacent to the corresponding second hole substantially corresponds to the diameter of the plurality of second holes.

Preferably, each of the plurality of grooves substantially extends along a line having a constant radius with respect to the center line of the second rotary element. In case of an increasing width, the plurality of grooves may be symmetrically shaped with respect to such line of constant radius.

The plurality of engagement elements may be arranged to allow coupling of the first rotary element and the second rotary element in one predetermined angular position of the first rotary element with respect to the second rotary element only.

Preferably, the plurality of first and second holes and thus the plurality of engagement elements are distributed over the first and second face, respectively, such that each of the plurality of first holes is aligned with a corresponding one of the plurality of second holes only in the one predetermined angular position of the first rotary element with respect to the second rotary element. That is, there is only one angular position in which all of the plurality of engagement elements can engage with of the first and second rotary elements. Thereby, coupling of the input shaft to the output shaft can be timed with respect to the reciprocating movement of a plunger within the baling chamber.

More specifically, the plunger reciprocally moves within the baling chamber in a fore and aft direction of the baler in order to form a bale of multiple charges of crop material. In a retracted position, the plunger clears a feed opening connecting the stuffer chute to the baling chamber. Hence, a charge of crop material collected within the stuffer chute can only be transferred into the baling chamber without colliding with the plunger or a previous charge of crop material while the plunger is in its retracted position. Consequently, the stuffer should only be actuated to transfer the charge of crop material into the baling chamber within a corresponding time slot in which the plunger is in its retracted position.

The plunger and the stuffer assembly may both be connected to the baler drive shaft by a corresponding gear box having a defined transmission ratio. Rotation of the input shaft of the stuffer drive mechanism may therefore be timed with respect to the movement of the plunger. By coupling the input shaft to the output shaft only in the one predetermined position thus results in a timed rotation of the output shaft with respect to the movement of the plunger.

For instance, at least two engagement elements of the plurality of engagement elements are located at different distances from the center line of the first rotary element and/or at least two engagement elements of the plurality of engagement elements are located in different angular positions with respect to the center line of the first rotary element. Being located in different angular positions means that, in a cross-sectional view, the at least two engagement elements are not radially aligned with each other. In other words, a radial line extending from the center line to a center of one of the at least two engagement elements is different from a radial line extending from the center line to a center of another engagement element of the at least two engagement elements.

Accordingly, a first engagement element of the plurality of engagement elements may be located at a first distance from the center line and a second engagement element of the plurality of engagement elements may be located at a second distance from the center line, wherein the first distance is different from the second distance.

Additionally or alternatively, the first engagement element may be located in a first angular position with respect to the center line and the second engagement element may be located in a second angular position with respect to the center line.

In order to precisely and electronically control the actuator, the actuator is preferably selected from a group comprising an electrical actuator, an electro-magnetic actuator, a pneumatic actuator, a hydraulic actuator, a mechanical actuator or a combination thereof. Most preferably, the actuator is an electro-magnetic actuator and the plurality of engagement elements is configured to interact with the electro-magnetic actuator. Preferably, the actuator directly acts on the plurality of engagement elements. That is, the actuator directly applies an actuating force to the plurality of engagement elements and no transfer mechanism is provided to transmit the force from the actuator to the plurality of engagement elements. The actuator may generally be mounted in or on the first or second rotary element or in close proximity thereto.

In one embodiment, the actuator comprises a plurality of actuating means, such as individual electromagnets or valves. The number of the plurality of actuating means preferably corresponds to the number of the plurality of engagement elements. In this way, it can be guaranteed that a sufficient force is applied to each of the plurality of engagement elements for coupling the first rotary element to the second rotary element.

Moreover, each actuating means of the plurality of actuating means may be aligned with one engagement element of the plurality of engagement elements. When the plurality of actuating means and the plurality of engagement elements are constantly aligned, a force can constantly be applied to the plurality of engagement elements to move them into and hold them in the extended and/or retracted position. It is therefore preferred, that the plurality of actuating means rotates with the plurality of engagement elements.

The present invention also relates to an agricultural baler, in particular a rectangular baler or large square baler, comprising a baling chamber, a plunger reciprocally movable within the baling chamber and a stuffer assembly according to the present invention. The stuffer chute is connected to the baling chamber and the stuffer is configured to transfer the charge of crop material collected within the stuffer chute into the baling chamber. The agricultural baler can therefore make full use of the advantages and features described with regard to the stuffer assembly.

The agricultural baler further comprises a pick-up unit configured to pick up cut crop material from the field and to feed the crop material into the stuffer chute where the crop material is collected and precompressed to form a charge of crop material. A feed opening connects the stuffer chute to the baling chamber and is preferably located in a bottom wall of the baling chamber. When the plunger is in a retracted position, the feed opening is cleared and the stuffer assembly can be operated to transfer the charge of crop material into the baling chamber. In the baling chamber, the reciprocating plunger compresses multiple charges of crop material to form a bale. Additional features of the baler are already described with reference to the timed coupling and baler power source above.

The agricultural baler may further comprise a baler control unit. The baler control unit and the stuffer assembly control unit may be configured as an integrated control unit of the baler or as separate control units. The baler control unit as well as the stuffer assembly control unit may be configured to receive user input.

The present invention further relates to a method for operating a stuffer assembly of an agricultural baler, the method comprising the steps of:

Collecting a charge of crop material within a stuffer chute of the stuffer assembly;

Providing an electronically controllable actuator of the stuffer assembly with a trip signal once the charge of crop material is to be transferred from the stuffer chute into a baling chamber of the baler; and Actuating a stuffer of the stuffer assembly in response to the trip signal by means of the actuator engaging a plurality of engagement elements with both of a first rotary element and a second rotary element, thereby coupling an input shaft to an output shaft of a stuffer drive mechanism.

In this way, operation of the stuffer assembly allows electronically controlled actuation of the stuffer thereby eliminating the need for a mechanical linkage between the stuffer chute and the stuffer clutch assembly as well as for a complex mechanical actuating arrangement configured to couple the input shaft to the output shaft. Also, a trip signal can then be easily adapted and individually associated with desired parameters, such as characteristics of the crop material collected within the stuffer chute.

Preferably, the method is employed by a stuffer assembly according to the present invention. All features and advantages described herein with reference to the stuffer assembly do therefore apply to the method as well and vice versa.

The step of collecting the charge of crop material within the stuffer chute is preferably performed by the pick-up unit of the baler and, if present, by a packer unit of the baler. The trip signal may be provided by the stuffer assembly control unit, as described above.

The trip signal is preferably provided depending on a characteristic of the crop material collected within the stuffer chute. The method may therefore further comprise the steps of:

Detecting the characteristic of the crop material collected within the stuffer chute, preferably by means of the plurality of sensors;

Providing an output signal indicating said characteristic, preferably by means of the plurality of sensors;

Monitoring said output signal and providing the trip signal when the output signal indicates a predetermined condition of said characteristic, preferably by means of the stuffer assembly control unit.

It is apparent that these steps may be performed while collecting the charge of crop material and result in the step of providing the trip signal.

The crop characteristic may comprise one or a combination of a density, a humidity, a weight, and a volume of the crop material collected within the stuffer chute, as well as a distribution of the crop material over the length and/or the width of the stuffer chute, as described above.

In this way, it is possible to trip the stuffer in response to a certain crop characteristic, such as the density, of the crop material reaching a predetermined condition, such as a threshold value. The desired crop characteristic and/or the predetermined condition may be selected by an operator of the baler and provided e.g. by means of a user input. Hence, tripping of the stuffer can be adapted as desired.

Also, by continuously monitoring the output signal, a trend of the detected characteristic can be determined, which may allow prediction of any further development of the characteristic, thereby enabling optimization of the stuffer timing. For example, it can be predicted whether waiting with the transfer of crop material into the baling chamber for an additional cycle of the plunger will result in an undesired condition of the charge of crop material and/or overly increased loads acting on the tine bar.

For example, a predetermined scheme may be provided for actuating the stuffer. The predetermined scheme may comprise criteria for tripping the stuffer. The criteria may be related to the crop characteristic detected by the plurality of sensors. The criteria may comprise a desired minimum pressure or density value and a desired maximum pressure or density value. A trip signal may be generated when the actually determined pressure or density value is between the desired minimum and maximum values. The predetermined scheme may be stored in the stuffer assembly control unit and/or received by the stuffer assembly control unit by a user input.

If, however, an undesired condition occurs and an overly increased load is nevertheless applied to the tine bar, the drive mechanism of the stuffer assembly can be protected from overload in the following manner. In order to actuate the plurality of engagement elements, the actuator applies a predetermined first force to each engagement element of the plurality of engagement elements causing the plurality of engagement elements to move into and remain in the extended position. An increased load acting on the plurality of tines of the stuffer results in an increased second force acting on the plurality of engagement elements against the first force. If the second force exceeds the first force, the plurality of engagement elements is pushed back into the retracted position, thereby decoupling the first rotary element from the second rotary element.

In greater detail, an obstacle, such as a stone, may be included in the crop material collected within the stuffer chute. When the stuffer is moved to transfer the charge of crop material into the baling chamber, the stuffer tines may hit said obstacle or the obstacle may get caught between the stuffer tines and a wall of the stuffer chute. In such an event, a load acting on the stuffer tines during transfer of the charge of crop material is overly increased. The increased load is transmitted to the output shaft via the stuffer arm and may be transmitted to further components of the drive mechanism. If the increased load, however, results in the second force acting on the plurality of engagement elements exceeding the first force, the first rotary element and the second rotary element will eventually be decoupled. Hence, the increased load cannot be transmitted to further components of the drive mechanism thereby protecting same from any damage.

Preferably, a torque required to transfer the charge of crop material can only be transmitted between the first rotary element and the second rotary element when all engagement elements of the plurality of engagement elements engage with the first and second rotary elements. Otherwise, the force acting on the engaged engagement elements will be greater than the predetermined first force causing the engagement elements to be pushed back into their retracted position. Coupling of the first rotary element to the second rotary element is therefore only possible in the one predetermined angular position of the first rotary element with respect to the second rotary element, as described above.

A further advantage is that the torque transmitted between the first and second rotary elements can be controlled via the first force. In order to do so, the actuator may be operable to vary and adapt the first force acting on the plurality of engagement elements. The higher the first force the higher a torque that can be transmitted.

BRIEF SUMMARY OF THE DRAWINGS

Further features and advantages of the present invention will now be described with reference to the accompanying drawings.

DETAILED DESCRIPTION OF THE INVENTION

Figure 1:
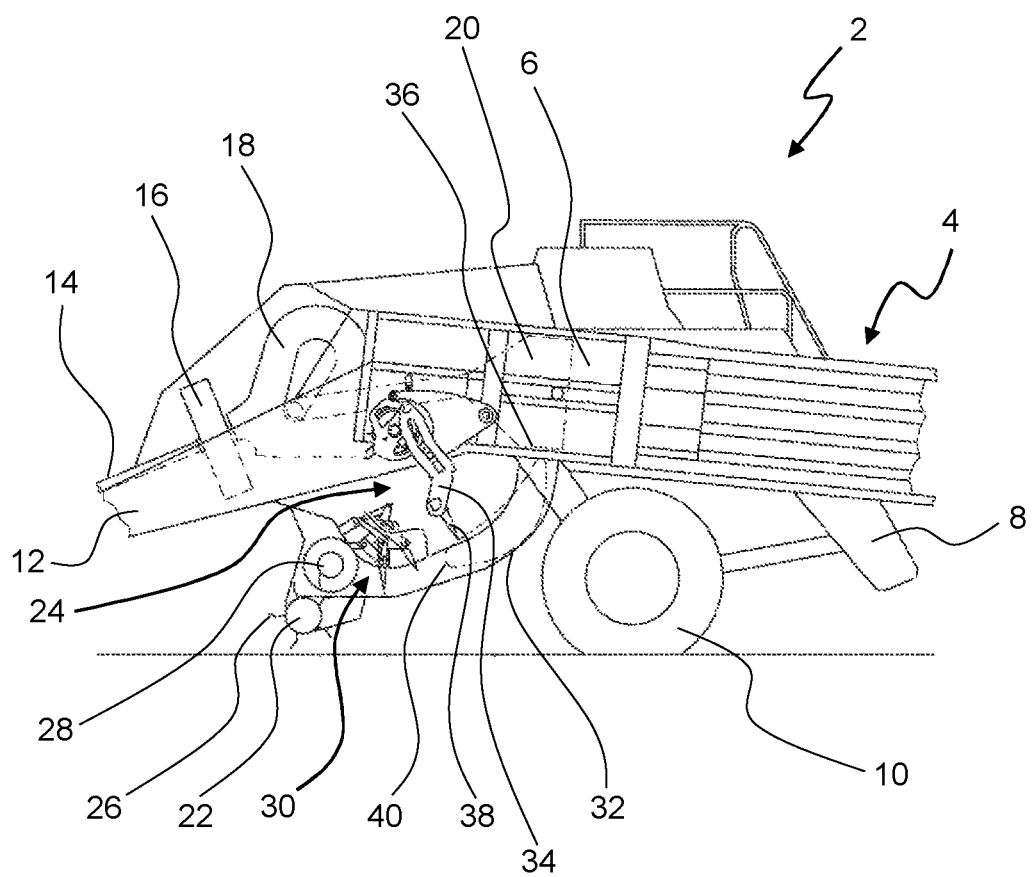
FIG. 1 is a schematic side view of an agricultural baler.

In FIG. 1 an agricultural baler 2 is shown in a side view. The baler 2 comprises a bale case 4 extending in a fore-and-aft direction of the baler 2 and defining a baling chamber 6, in which a bale is to be formed. The bale case 4 is supported by a frame 8 of the baler 2, which in turn is carried by ground-engaging wheels 10. A forwardly extending tongue 12 is provided on the baler 2 to hitch the baler 2 to a towing vehicle (not shown), such as a tractor, for advancing the baler 2 across a field. Further, the baler 2 comprises a forwardly extending baler drive shaft 14 to be connected to a power take-off (PTO) of the towing vehicle in order to transfer power from the towing vehicle to the baler 2. In the baler 2, a flywheel 16 and a gearbox 18 are connected to the baler drive shaft 14 to transmit power to a plunger 20 of the baler 2. The plunger 20 is configured to reciprocally move in the fore-and-aft direction of the baler 2 within the baling chamber 6 for periodically compacting crop material fed into the baling chamber 6.

The baler 2 further comprises a pick-up unit 22 for picking up windrowed crop material from the field and delivering the crop material rearward towards a stuffer assembly 24 of the baler 2. The pick-up unit 22 may have a plurality of lifting tines 26 sweeping up crop material from the field. Augers 28 and/or a cut unit may be provided rearward of the pick-up unit 22 in a known manner. Moreover, a packer unit 30 may be positioned behind the pick-up unit 22 for feeding the crop material into a stuffer chute 32 of the stuffer assembly 24. The packer unit 30 may be configured to collect and precompress the crop material within the stuffer chute 32.

Besides the stuffer chute 32, the stuffer assembly 24 comprises a stuffer 34 configured to transfer the charge of crop material collected within the stuffer chute 32 into the baling chamber 6. The stuffer chute 32 is thus connected to the baling chamber 6 by a feed opening 36 in a bottom wall of the baling chamber 6. The stuffer 34 comprises a plurality of tines 38 movable along a stuffer trajectory 40 indicated by dotted lines in FIG. 1. In the embodiment shown, the stuffer 34 only transfers the charge of crop material into the baling chamber 6 and the stuffer trajectory 40 thus only includes one long stroke of the plurality of tines 38 within the stuffer chute 32.

Figure 2:
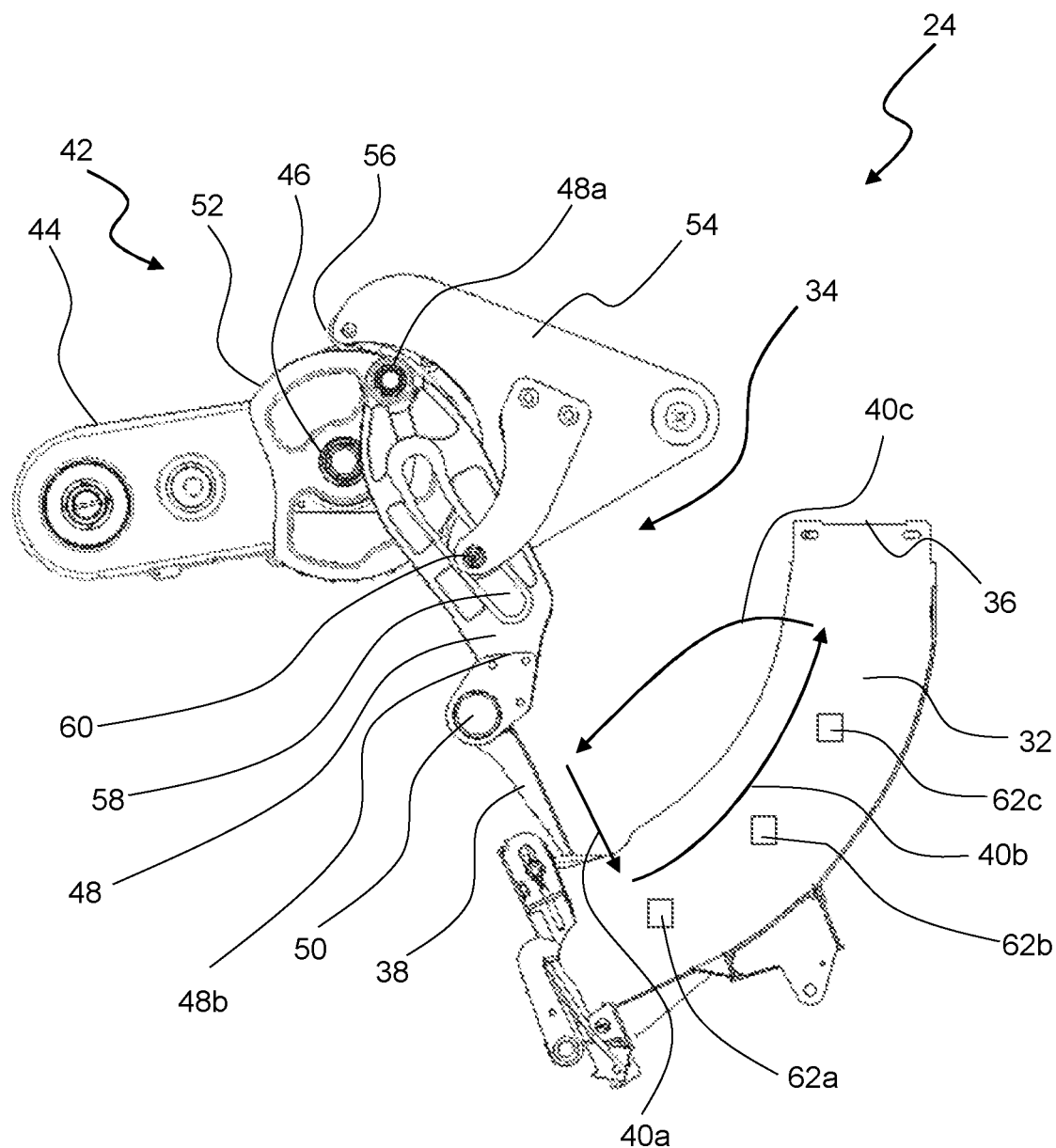
FIG. 2 is a schematic side view of a stuffer assembly of the baler according to FIG. 1.

The stuffer assembly 24 is shown in FIG. 2 in greater detail. In addition to the stuffer chute 32 and the stuffer 34, the stuffer assembly 24 comprises a stuffer drive mechanism 42 having, for example, a stuffer gearbox 44 connected to a stuffer drive shaft 46 driving the stuffer 34. The stuffer 34 comprises a stuffer arm 48 having a first end 48a coupled to the stuffer drive mechanism 42 and a second end 48b opposite the first end 48a. A tine bar 50 carrying the plurality of tines 38 is mounted on the second end 48b of the stuffer arm 48.

The stuffer trajectory 40 has a first section 40a along which the plurality of tines 38 is inserted into the stuffer chute 32, a second section 40b along which the tines 38 are moved within the stuffer chute 32 for transferring the crop material, and a third section 40c along which the tines 38 are moved out of the stuffer chute 32 and back to their original position shown in FIG. 2. In the first and second section 40a, b of the stuffer trajectory 40 the plurality of tines 38 engages the crop material present within the stuffer chute 32 resulting in a certain load being applied to the tines 38. Also, a tine 38 of the plurality of tines 38 may potentially hit an obstacle contained in the crop material, such as a stone or the like, causing an increased load acting on said tine 38. In addition, the degree of compression of the crop material within the stuffer chute 32 may affect the load acting on the plurality of tines 38.

In order to move the plurality of tines 38 along the stuffer trajectory 40, the first end 48a of the stuffer arm 48 is pivotally coupled to a cam disk 52 provided on the stuffer drive shaft 46 and rotating with the stuffer drive shaft 46. In addition, a support member 54 may be provided, wherein the support member 54 comprises a cam follower 56 contacting a cam surface of the cam disk 52 and a pin 60 slidably received within a longitudinal slot 58 in the stuffer arm 48.

Figure 3:
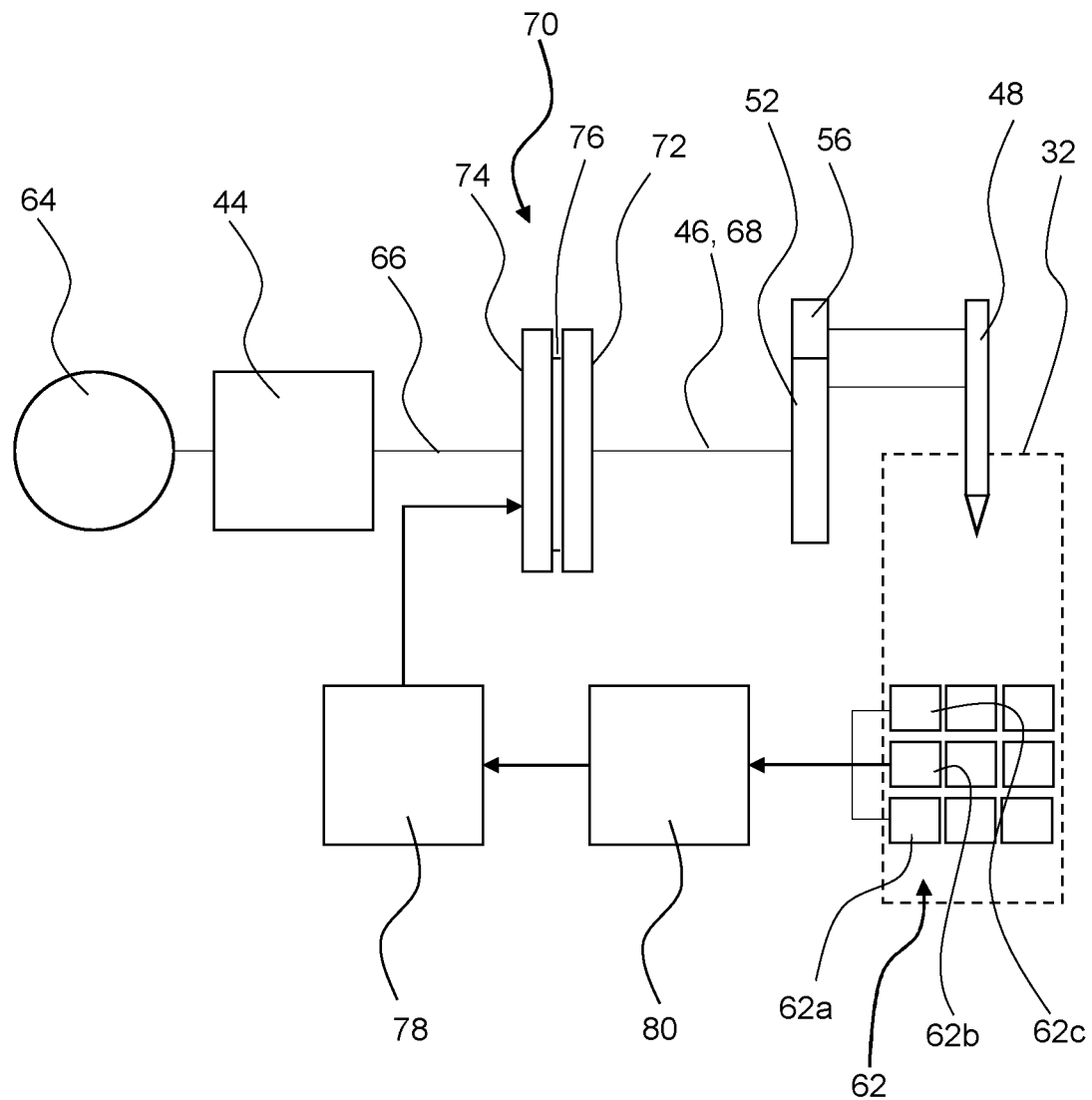
FIG. 3 is a schematic diagram of the stuffer assembly according to FIG. 2.

The stuffer assembly 24 may further comprise a plurality of sensors 62 configured to detect a characteristic of crop material within the stuffer chute 32 and to provide an output signal indicating said characteristic. The plurality of sensors 62 is preferably distributed across the stuffer chute 32. For example, the plurality of sensors 62 comprises a first sensor 62a, a second sensor 62b, and a third sensor 62c arranged behind each other between an inlet and an outlet of the stuffer chute 32 along the length of the stuffer chute 32. Additional sensors of the plurality of sensors 62 may be arranged between a left sidewall and a right sidewall of the stuffer chute 32, as indicated in FIG. 3. Of course, the plurality of sensors 62 may be distributed across the stuffer chute 32 as desired to detect the characteristic of crop material.

The characteristic detected by the plurality of sensors 62 may comprise one or a combination of a density, a humidity, a weight, and a volume of the crop material collected within the stuffer chute 32, as well as a distribution of the crop material over the length and/or the width of the stuffer chute 32.

An output signal of the plurality of sensors 62 indicating the detected crop characteristics may be used to trip the stuffer drive mechanism 42, which is schematically shown in FIG. 3 an will now be described.

A power source, e.g. in the form of a drive shaft 64, may provide an incoming torque to the stuffer drive mechanism 42. The drive shaft 64 may correspond to the baler drive shaft 14 or may be coupled to the baler drive shaft 14, which in turn is connectable to a PTO of the towing vehicle. The drive mechanism 42 comprises an input shaft 66, which is preferably coupled to the drive shaft 64 by means of the stuffer gearbox 44. An output shaft 68 of the drive mechanism 42 is coupled to the first end 48a of the stuffer arm 48, for example as shown in FIG. 2 with the output shaft 68 being coupled to the stuffer drive shaft 46 or corresponding to the stuffer drive shaft 46.

Since the stuffer 34 shall only move along the stuffer trajectory 40 once the stuffer chute 32 is loaded to a desired or predetermined degree with a charge of crop material but shall remain in its home position between the stuffer cycles, the input shaft 66 is selectively coupled to and decoupled from the output shaft 68 of the drive mechanism 42. Hence, the drive mechanism 42 comprises a clutch assembly 70 configured to selectively couple the input shaft 66 to the output shaft 68 in order to actuate the stuffer 34. A torque can be transmitted from the input shaft 66 to the output shaft 68 when the clutch assembly 70 is engaged, but no torque is transmitted when the clutch assembly 70 is disengaged.

The clutch assembly 70 comprises a first rotary element 72 and a second rotary element 74, wherein one of the first and second rotary elements 72, 74 is provided on the input shaft 66 and in the other one of the first and second rotary elements 72, 74 is provided on the output shaft 68. The first rotary element 72 can be coupled to the second rotary element 74 by means of a plurality of engagement elements 76 indicated in FIG. 3. Each engagement element 76 of the plurality of engagement elements 76 is configured to selectively engage with both of the first and second rotary elements 72, 74, thereby coupling the first rotary element 72 to the second rotary element 74. The plurality of engagement elements 76 will be described in greater detail with reference to FIGS. 4 and 6.

An electronically controllable actuator 78 of the clutch assembly 70 is configured to engage and/or disengage the plurality of engagement elements 76 with both of the first and second rotary elements 72, 74. Preferably, the actuator 78 is controlled by a control unit 80 communicatively connected to the actuator 78 to provide the actuator 78 with a trip signal. In order to do so, the control unit 80 may be communicatively connected to the plurality of sensors 62 to receive the output signal of the plurality of sensors 62. The control unit 80 may then provide the trip signal based on the output signal.

For example, the plurality of sensors 62 detects a characteristic, such as a density, of the crop material within the stuffer chute 32 and provides an output signal indicating said characteristic to the control unit 80. The control unit 80 receives the output signal, monitors the output signal and provides the trip signal once the output signal indicates a predetermined condition of said characteristic, e.g. when the density of the crop material reaches a predetermined density value or lies within a predetermined range.

Figure 4A:
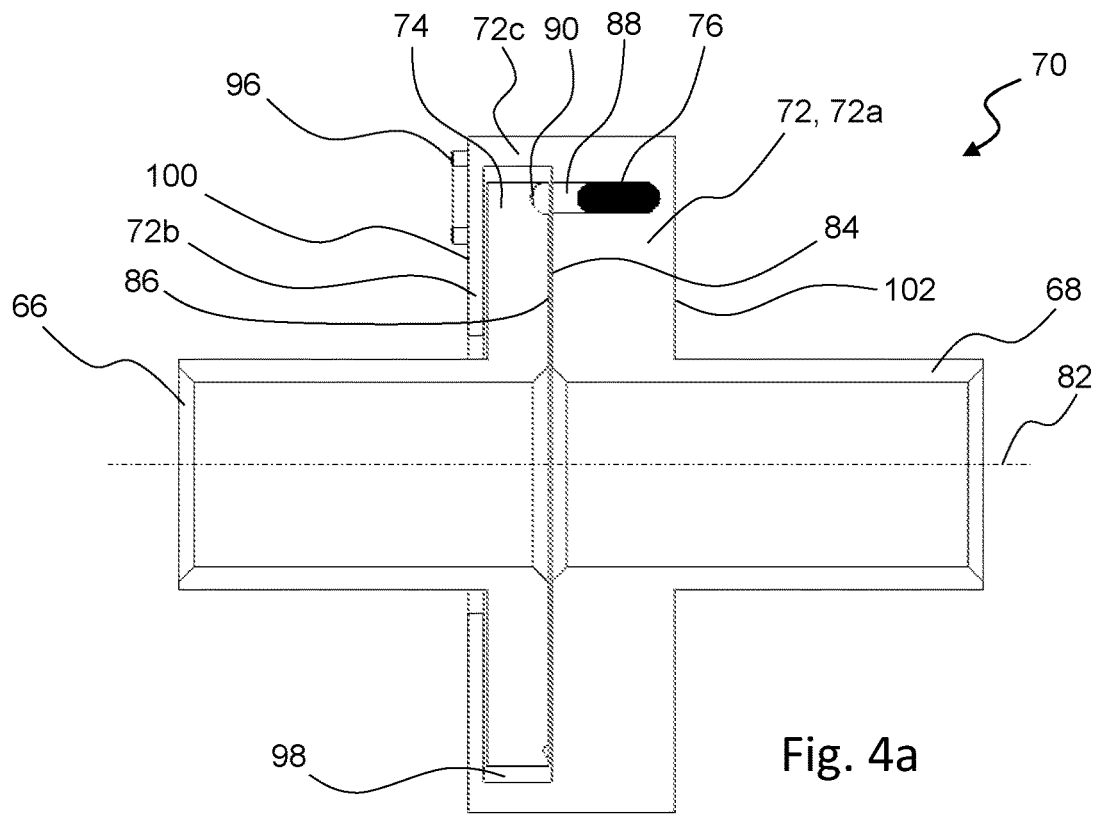
FIGS. 4a, 4b are cross-sectional views of a clutch assembly of the stuffer assembly according to FIG. 3.
Figure 4B:
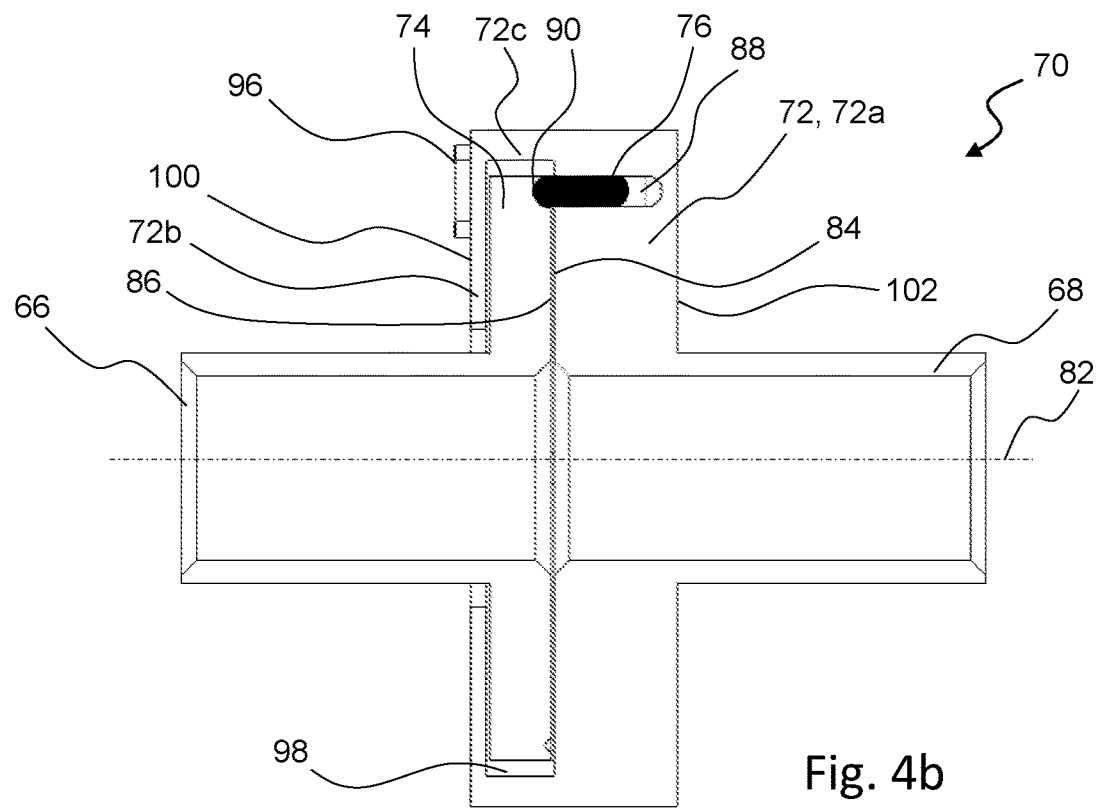
Figure 5:
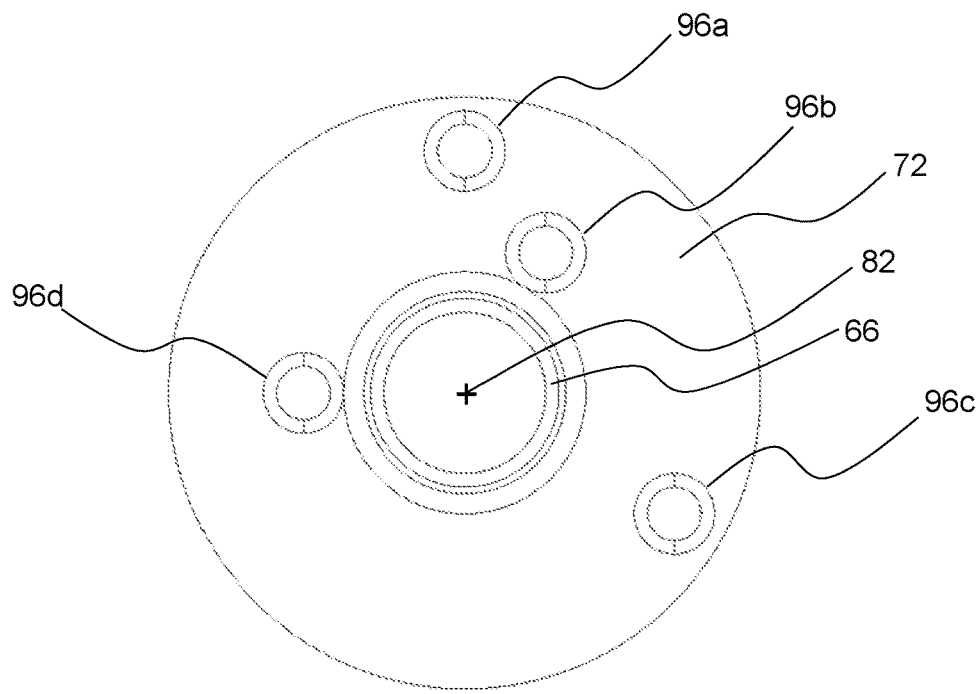
FIGS. 5, 6 are front views of the clutch assembly of the stuffer assembly according to FIG. 3.
Figure 6:
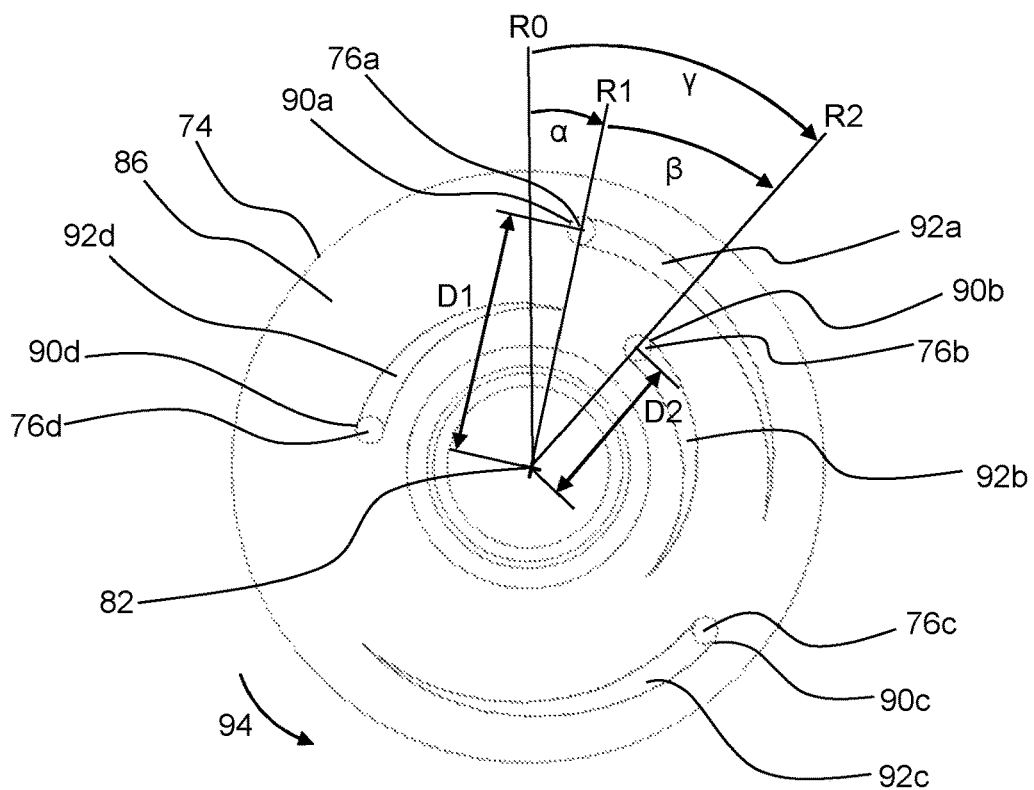

In FIGS. 4 to 6 the clutch assembly 70 is shown in detail. In the cross-sectional views of FIGS. 4a and 4b only one engagement element 76 of the plurality of engagement elements 76 is visible. However, all engagement elements 76 of the plurality of engagement elements 76 distributed across the first rotary element 72, as shown in FIG. 6, are configured and positioned accordingly.

In order to engage and disengage the plurality of engagement elements 76 with the first and second rotary elements 72, 74, it is particularly preferred that each engagement element 76 of the plurality of engagement elements 76 is movably received in the first rotary element 72 such that it is movable between a retracted position shown in FIG. 4a and an extended position shown in FIG. 4b. The direction of movement of the plurality of engagement elements 76 may be parallel to an axial direction of the first rotary element 72. In particular, the plurality of engagement elements 76 are simultaneously movable between their retracted positions and their extended positions, such that all engagement elements 76 of the plurality of engagement elements 76 are either arranged in the retracted position or in the extended position.

In the retracted position shown in FIG. 4a, each engagement element 76 of the plurality of engagement elements 76 is completely received in the first rotary element 72. In the extended position shown in FIG. 4b, each engagement element 76 of the plurality of engagement elements 76 protrudes from the first rotary element 72 and engages with the second rotary element 74 as well. Consequently, in the extended position, each of the plurality of engagement elements 76 is partially received in the second rotary element 74, thereby coupling the first rotary element 72 to the second rotary element 74.

The first and second rotary elements 72, 74 may each comprise a disk-like shape integrally formed with the respective shaft 66, 68, such as in the form of a flange, or fixedly attached to the respective shaft 66, 68, such as in the form of a separate disk mounted via a shaft-hub joint. The first and second rotary elements 72, 74 may be coaxially aligned, such that, preferably, an axis of rotation or a center line of the first rotary element 72, the second rotary element 74, the input shaft 66 and the output shaft 68 coincide to form a common center line 82 shown as a dotted line. The first and second rotary elements 72, 74 may be arranged in parallel, such that a first face 84 of the first rotary element 72 and a second face 86 of the second rotary element 74 are parallel and facing each other. The center line 82 extends substantially perpendicular to the first and second faces 84, 86.

To receive the plurality of engagement elements 76, the first rotary element 72 may comprise a plurality of first holes 88 formed in the first face 84 and the second rotary element 74 may comprise a plurality of second holes 90 formed in the second face 86. Each of the plurality of first and second holes 88, 90 is configured to at least partially receive an engagement element 76 of the plurality of engagement elements 76. In a preferred embodiment, each of the plurality of engagement elements 76 has a cylindrical shape, such as a pin, and an inner diameter of the first and second holes 88, 90 substantially corresponds to an outer diameter of the engagement elements 76. The plurality of engagement elements 76 may have a rounded head at least on an end directed towards the second face 86 and, preferably on both end in a longitudinal direction as shown. Of course, the plurality of engagement elements 76 may also have flat ends, if desired.

As can be best seen in FIG. 6 along with FIGS. 4a, b, a plurality of grooves 92 may be formed in the second face 86 of the second rotary element 74. Each groove 92a, 92b, 92c, 92d of the plurality of grooves 92 extends in a circumferential direction 94 of the second rotary element 74 towards and ends in one second hole 90a, 90b, 90c, 90d of the plurality of second holes 90. Preferably, each of the plurality of grooves 92 extends along a line having a constant radius with respect to the center line 82.

The plurality of grooves 92 may have a constant width with respect to the line of constant radius. In a preferred embodiment, however, the width of the plurality of grooves 92 increases towards the respective second hole 90a, 90b, 90c, 90d. In this case, each groove 92 may be symmetrically shaped with respect to a circumferential line of constant radius.

It is further preferred that a depth of each of the plurality of grooves 92 increases towards the respective second hole 90a, 90b, 90c, 90d of the plurality of second holes 90.

If the plurality of engagement elements 76 is moved into the extended position, they will contact the second face of 86 of the second rotary element 74 and not be able to move further into their longitudinal direction. In this position, each of the engagement elements 76 approaches one of the grooves 92 provided on the substantially the same radius with respect to the center line 82. Further rotation between the first and second rotary elements 72, 74 will move each of the plurality of engagement elements 76 into and along the respective one of the grooves 92 towards the respective second hole 90a, 90b, 90c, 90d. Due to the increasing depth of the plurality of grooves 92, the engagement elements 76 are allowed to increasingly move into their extended position. Thereby, smooth insertion of the plurality of engagement elements 76 into the plurality of second holes 90 is facilitated.

The actuator 78 is configured to move the plurality of engagement elements 76 from the retracted position into the extended position and/or from the extended position into the retracted position. For example, the plurality of engagement elements 76 may be biased into one of the retracted position and the extended position and the actuator 78 is configured to move the plurality of engagement elements 76 into the other of the retracted position and the extended position against the bias. In the embodiment shown, a spring (not shown) may be provided in each of the plurality of first holes 88 retaining the respective engagement element 76 in the retracted position.

In order to precisely apply an adequate force to the plurality of engagement elements 76, the actuator 78 preferably comprises a plurality of actuating means 96, as shown for example in FIG. 5. The number of the plurality of actuating means 96 preferably corresponds to the number of the plurality of engagement elements 76, such that one actuating means 96a, 96b, 96c and 96d can be assigned to each of the plurality of engagement elements 76a, 76b, 76c, and 76d. Each actuating means 96a, 96b, 96c and 96d is formed by an electromagnet, as shown, and is controlled by the control unit 80.

Each actuating means 96a, 96b, 96c and 96d of the plurality of actuating means 96 may be aligned with one engagement element 76a, 76b, 76c and 76d of the plurality of engagement elements 76. When the plurality of actuating means 96 and the plurality of engagement elements 76 are constantly aligned, a force can constantly be applied to the plurality of engagement elements 76 to move them into and hold them in the extended and/or retracted position. It is therefore preferred that the plurality of actuating means 96 rotates with the plurality of engagement elements 76.

In the embodiment shown, the first rotary element 72 carries the plurality of actuating means 96. The first rotary element 72 may be formed to receive the second rotary element 74, preferably between the plurality of engagement elements 76 and the plurality of actuating means 96. That is, the first rotary element 72 defines a cavity 98 receiving and substantially encapsulating the second rotary element 74. The first rotary element 72 may therefore comprise a first section 72a and a second section 72b, wherein the first section 72a includes the first face 84 and the second section 72b is arranged offset and parallel to the first section 72a. The second rotary element 74 is then received between the first and second sections 72a, b of the first rotary element 72. The first and second sections 72a, b may be connected by a web-like third section 72c arranged radially outward of the second rotary element 74 to form the cavity 98. In this case, the plurality of actuating means 96 may be provided on the second section 72b of the first rotary element 72, in particular on an outwardly facing surface 100 thereof extending parallel to the first face 84. Alternatively or in addition, a plurality of actuating means 96 could be provided on the first section 72a of the first rotary element 72 as well, preferably on an outwardly facing end face 102.

Of course, alternative embodiments are conceivable as well. For example, the first rotary element 72 may be a flange-like member, such as the second rotary element 74 shown in FIG. 4. The plurality of actuating means 96 may then be arranged on an end face 102 of the first rotary element 72, the end face 102 being parallel to the first face 84.

In any case, the actuator and in particular the plurality of actuating means 96 may be configured to exert a pushing force and/or a pulling force to the plurality of engagement elements 76 in order to move them between the extended and retracted positions.

To achieve a timing of the stroke of the stuffer 34 transferring a charge of crop material into the baling chamber 6 and reciprocating movement of the plunger 20 within the baling chamber 6, timed coupling of the input shaft 66 to the output shaft 68 is required. Therefore, the plurality of engagement elements 76 are arranged to allow coupling of the first rotary element 72 to the second rotary element 74 only in one predetermined angular position of the first rotary element 72 with respect to the second rotary element 74. Hence, the first and second rotary elements 72, 74 can only be coupled to each other when arranged in the predetermined angular position but cannot be coupled in any other angular position.

As shown in FIGS. 5 and 6, at least two of the plurality of engagement elements 76 are located at different distances from the center line 82 in a radial direction and/or at least two of the plurality of engagement elements 76 are located in different angular positions with respect to the center line 82.

More specifically, a first engagement element 76a is arranged at a first distance D1 from the center line 82 and a second engagement element 76b is arranged at a second distance D2 from the center line 82, wherein the second distance D2 is different from the first distance D1. Being located in different angular positions means that the at least two engagement elements, such as the first and second engagement elements 76a, b, are not aligned in a radial direction of the first rotary element 72. Rather, a first radial line R1 indicating a first angular position is defined between the center line 82 and the first engagement element 76a and a second radial line R2 indicating a second angular position is defined between the center line 82 and the second engagement element 76b. An angle β is defined between the first and the second radial lines R1, R2, wherein the angle β is greater than 1° but smaller than 360°.

In other words, a first angle α is defined between a radial reference line R0 and the first radial line R1 and a second angle γ is defined between the radial reference line R0 and the second radial line R2, wherein the first angle α differs from the second angle γ. The reference line R0 is a virtual line and can be any radial line extending radially from the center line 82 and being different from the first and second radial lines R1, R2.

It will be appreciated that the features described with reference to the accompanying drawings are not limited to the specific embodiments of the stuffer assembly 24 and the clutch assembly 70 but may apply to alternative embodiments as well.

The invention claimed is:

1. A stuffer assembly for an agricultural baler comprising:
a stuffer chute for collecting and precompressing a charge of crop material therein;
a stuffer configured to transfer the charge of crop material collected within the stuffer chute into a baling chamber of the agricultural baler, the stuffer comprising a stuffer arm having a first end and a second end opposite the first end, wherein a tine bar is mounted on the second end of the stuffer arm; and
a drive mechanism for driving the stuffer, the drive mechanism comprising an input shaft connectable to a power source, an output shaft coupled to the first end of the stuffer arm, and a clutch assembly for selectively coupling the input shaft to the output shaft,
wherein the clutch assembly comprises:
a first rotary element and a second rotary element, wherein one of the first rotary element and the second rotary element is provided on the input shaft and the other one of the first rotary element and the second rotary element is provided on the output shaft,
a plurality of engagement elements, wherein each engagement element of the plurality of engagement elements is configured to selectively engage with both of the first rotary element and the second rotary element, and
an electronically controllable actuator configured to engage and disengage the plurality of engagement elements with both of the first rotary element and the second rotary element.

2. The stuffer assembly according to claim 1, wherein the stuffer assembly further comprises a plurality of sensors configured to detect a characteristic of crop material collected within the stuffer chute and to provide an output signal indicative of the characteristic, wherein the actuator is configured to move the plurality of engagement elements in response to a trip signal associated with the output signal of the plurality of sensors.

3. The stuffer assembly according to claim 2, wherein the stuffer assembly further comprises a control unit communicatively connected to the plurality of sensors and to the actuator, wherein the control unit is configured to receive the output signal of the plurality of sensors and to provide the trip signal to the actuator based on the output signal.

4. The stuffer assembly according to claim 1, wherein:
each engagement element of the plurality of engagement elements is movably received in the first rotary element such that it is movable between a retracted position and an extended position,
in the retracted position, each engagement element of the plurality of engagement elements is completely received in the first rotary element, and
in the extended position, each engagement element of the plurality of engagement elements protrudes from the first rotary element and engages with the second rotary element.

5. The stuffer assembly according to claim 4, wherein each engagement element of the plurality of engagement elements is movable between the retracted position and the extended position in an axial direction of the first rotary element.

6. The stuffer assembly according to claim 4,
wherein the first rotary element comprises a first face and the second rotary element comprises a second face parallel to and facing the first face, and
wherein a plurality of second holes is formed in the second face, wherein each second hole of the plurality of second holes partially receives one engagement element of the plurality of engagement elements when positioned in the extended position.

7. The stuffer assembly according to claim 6, wherein a plurality of grooves is formed in the second face, wherein each groove of the plurality of grooves extends in a circumferential direction of the second rotary element towards one second hole of the plurality of second holes and has a depth increasing towards the respective second hole of the plurality of second holes.

8. The stuffer assembly according to claim 1, wherein the plurality of engagement elements is arranged to allow coupling of the first rotary element and the second rotary element only in one predetermined angular position of the first rotary element with respect to the second rotary element.

9. The stuffer assembly according to claim 8, wherein:
at least two engagement elements of the plurality of engagement elements are located at different distances from a center line of the first rotary element, or
at least two engagement elements of the plurality of engagement elements are located in different angular positions with respect to the center line of the first rotary element.

10. The stuffer assembly according to claim 1, wherein the actuator is selected from a group comprising an electrical actuator, an electromagnetic actuator, a pneumatic actuator, a hydraulic actuator, a mechanical actuator, or a combination thereof.

11. The stuffer assembly according to claim 1, wherein the actuator comprises a plurality of actuating means.

12. The stuffer assembly according to claim 11, wherein each actuating means of the plurality of actuating means is aligned with one engagement element of the plurality of engagement elements.

13. An agricultural baler comprising a baling chamber, a plunger reciprocally movable within the baling chamber, and a stuffer assembly connected to the baling chamber, the stuffer assembly comprising:
a stuffer chute for collecting and precompressing a charge of crop material therein;
a stuffer configured to transfer the charge of crop material collected within the stuffer chute into the baling chamber, the stuffer comprising a stuffer arm having a first end and a second end opposite the first end, wherein a tine bar is mounted on the second end of the stuffer arm; and
a drive mechanism for driving the stuffer, the drive mechanism comprising an input shaft connectable to a power source, an output shaft coupled to the first end of the stuffer arm, and a clutch assembly for selectively coupling the input shaft to the output shaft,
wherein the clutch assembly comprises:
a first rotary element and a second rotary element, wherein one of the first rotary element and the second rotary element is provided on the input shaft and the other one of the first rotary element and the second rotary element is provided on the output shaft,
a plurality of engagement elements, wherein each engagement element of the plurality of engagement elements is configured to selectively engage with both of the first rotary element and the second rotary element, and an electronically controllable actuator configured to engage and disengage the plurality of engagement elements with both of the first rotary element and the second rotary element.

* * * * *